Patented May 15, 1951

2,552,910

UNITED STATES PATENT OFFICE 2,552,910

COATED GLASS FIBERS AND METHOD OF MAKING SAME

Robert Steinman, Los Angeles, Calif., assignor to Owens-Corning Fiberglas Corporation, a corporation of Delaware No Drawing. Application April 16, 1947, Serial No. 741,939

16 Claims. (Cl. 117—72)

This invention relates to fabrications of mineral fibers and to the treatment of the surfaces of mineral fibers for modifying the characteristics thereof for applications wherein it is desired to coat or adhere, or in some instances to reduce the adherence or attraction of materials to the surfaces of the mineral fibers, or wherein the fibers are used to effect the separation or purification by preferential wetting or repulsion of one or a group of materials in the presence of others.

One may take the adherence of resinous material to the surfaces of glass fibers as illustrative of the factors that are involved. While a large number of resinous materials apparently have little or no adhesion to glass surfaces, it is generally considered by many that there are others characterized as adhering strongly to glass surfaces. After considerable research, it becomes evident that when the statement is made that a resinous material "shows good adhesion to glass" it generally can be concluded that such reference relates to properties determined under ordinary room conditions and does not apply to the properties determined following exposure to high humidities or immersion in water. This may be explained by the fact that the glass surfaces are highly hydrophilic and they exhibit a preferential attraction to moisture. On exposure to high humidities, a moisture layer builds up on the glass surface, and this moisture layer either fully displaces the resinous film or greatly reduces the adhesion tension between the resinous film and the relatively smooth glass fiber surface, whereby the resinous film and the glass surface are easily separated.

This loss of adherence and the presence of an intervening moisture layer at high humidities presents a serious handicap to the use of the various combinations of glass fibers and resinous bodies in applications wherein wet strength, electrical resistance, colorability, washability and permanence are of importance. The applications include structural products, insulation, textiles, reinforcement and filling of plastics, and other uses of glass fibers. It remains therefore to provide glass fibers and other fibrous siliceous glass-like materials with surface characteristics which, in a permanent fashion, preferentially attract or repel a wide variety of materials which are taken to include various solids, fluids, or gases, singly or in combination.

For example, when the fibers are used as a resinous reinforcement, it is desirable, in some instances, to insure a strong bond between the resinous material and fiber surfaces under all conditions of exposure, and in other instances, initially and permanently to foster a lack of adherence between these adjacent bodies. When these glass fibers are used as a tower packing, in some instances, it is desirable further to improve the hydrophilic characteristics of the glass fiber surfaces, as when used for the demulsification of water-in-oil emulsions, and, in other instances, to render the surfaces hydrophobic or non-polar, as the case may be, so that it may be preferentially wetted by one hydrocarbon when in the presence of other materials for rectification or purification applications.

In one aspect of this invention, I propose to modify the surface characteristics of the glass fibers by coating their surfaces with a substance that perferentially adheres or wets glass in the presence of most atmospheres. By proper construction of the substance, the glass fiber surface can be made more receptive or have a greater affinity to a wide variety of materials, some of which were heretofore considered non-adherent to glass surfaces, and repellent to other materials some of which heretofore readily wetted glass. Thus, these glass or siliceous glass-like fibers may be more effectively used as a tower packing, resinous reinforcement, filler for molding and rubber compounds, electrical insulation, structural fabrics or as a recipient for coloring material in the form of dyes or pigmented carriers.

As the principal constituent in my treating material, I make use of a complex compound, the type of which is referred to as a Werner complex fully described in the patents to Iler, Nos. 2,273,040 and 2,356,161, issued on February 17, 1942, and August 22, 1944, respectively. The complex compound is described in these patents as a chromium complex in which a tri-valent nuclear chromium atom is coordinated with acyclic or carbocyclic acido group with at least 10 carbon atoms.

I have found that these Werner complexes can be made strongly to adhere to mineral fiber surfaces and to improve the bond strength between these fibers and resinous coating or impregnating materials. It is believed that adherence results from the fact that the nuclear chromium atom is coordinated, in some manner, with the substances which comprise the surface of these siliceous bodies. Whatever the reason may be, these mineral fiber surfaces, and especially glass fibers, maintain these new characteristics even in the presence of various atmospheric changes and conditions.

I have further discovered that these mineral fiber surfaces, and especially glass fiber surfaces, can be made still more attractive to resinous materials and a wide variety of other materials if the chromium complex, which is applied thereon, is formulated of an acido group which, in itself, has a tendency to associate or promote association as by coordination or functional attraction with other materials. Although specific reference will be made to various carboxylic acids suitable to provide the desired acido group in co-ordination with the tri-valent chromium atom, it is understood that the respective alcohols may also be used in accordance with the Iler patents.

By constructing the acido group with a labile hydrogen atom, the glass surface having the complex thereon can be made more attractive to any of a wide variety of materials having an atom of oxygen, nitrogen or sulfur as a part of an ether, ester, ketone, aldehyde, alcohol or nitro group if the atom is oxygen, and the thio modifications thereof if sulfur, or as a part of a cyano, azo, amino, amido and nitro group or as the nitrogen atom in a heterocyclic group if the atom is nitrogen. Alternatively, if the acido group contains one of the oxygen, nitrogen or sulfur atoms in any of the above molecular arrangements, the glass surface appears to be more receptive to materials containing a highly orientated or labile hydrogen atom.

As a further improvement, I have found that, if in the acido group coordinated with the nuclear chromium atom, there is provided a group having a high di-pole moment, then other materials having the same or other polar atoms or groups readily wet the treated surface in preference to water or other less polar materials. If the acido group is selected to be non-polar, then the glass surface exhibits non-polar characteristics and is readily wet by other non-polar substances.

In specific applications of the invention, suitable orientation and activation of the hydrogen atom in the acido group was effected by association therewith of one or more highly negative groups. These highly negative groups are taken to include the halogens, such as fluorine, chlorine, bromine and iodine as illustrated by monochloroacetic acid, dichloroacetic acid, $\beta$ chloro-acrylic acid, $\alpha$ bromopropionic acid, $\alpha,\beta$ dichloro-propionic acid and the like; the highly unsaturated groups of the type —C≡C— as found in propiolic acid, pentyn-4-oic acid, dehydro-undecylenic acid, and the like; a cyano group —C≡N as positioned in the formula

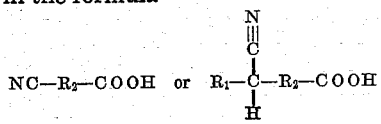

where $R_1$ is hydrogen or a monovalent alkyl, aryl, aralkyl or heterocyclic radical or derivative thereof, and $R_2$ is a like divalent group; nitro groups of the type —$NO_2$ on a suitable substituted carboxylic acid, and active methylene groups of the type —$CH_2$— such, for example, as is found in malonic acid.

Other suitable highly negative groups include the aryl groups of the type benzyl, naphthyl, and the like and their derivatives, and the carbonyl groups illustrated by

Although formic acid and its derivatives is illustrative of a compound containing a carbonyl group capable of activating the hydrogen atom on the $\beta$ carbon and is also capable of reacting to form the acido group, other carbonyl groups some of which may compromise keto, aldo and other carboxylic groups not forming a part of the reacted carboxyl group are equally suitable. These may be illustrated as including glyoxalic acid, ethanal acid, butanal acid, keto propionic acid, glucic acid, aceto-acetic acid, $\beta$-acetyl propionic acid, phenyl-acetic acid, $\beta$-phenyl acrylic acid, benzoylacetic acid and the saturated or unsaturated dibasic acids.

The desired activity results from the arrangement of these highly negative groups in close proximity to a carbon containing a hydrogen atom such, for example, as when the hydrogen is on the $\alpha$ carbon atom and, more noticeably, when the negative groups are arranged on the same carbon, and when at least one, but preferably more of these highly negative groups are in a position to influence the activity or orientation of the hydrogen.

By the term polar group, is meant the halogeno, keto, cyano, nitro, nitroso, phenyl, carboxy, hydroxy, amine, and ester type groups, as well as, the unsymmetrical unsaturated groups and the like, while the non-polar compounds are illustrated by the more saturated hydrocarbons and symmetrical unsaturated or symmetrically substituted hydrocarbons.

Although the exact relation between molecules which bring about these greatly improved results, does not appear to be capable of full explanation by any known theory, there is reason to believe that physico-chemical forces between members of these groups provide some degree of attraction of one group for the other. These forces may be in the nature of the electronic or ionic forces in which the electrons of a highly negative atom (the donor) are shared by a highly orientated or labile hydrogen atom (the acceptor). These physico-chemical forces may also result from the mutual attraction of one polar group for another or between non-polar groups.

This may account for the fact that when cyanoacetic acid is used to form the acido group in the chromium complex, such resinous materials as polyvinyl chloride, polyvinyl acetates, polyacrylates, polymethacrylates and other polyalkylacrylates, polystyrene, chlorinated derivatives of polystyrene, polyvinyl pyridines, polyvinyl carbazoles, synthetic rubbers of the type of chloroprene, butadiene-acrylonitrile copolymers, butadiene-styrene copolymers and other organic materials or resinous material having highly negative groups in close proximity with a hydrogen atom may be strongly adhered to the treated glass surfaces.

This same consideration may account for the fact that, when the acido group is formed of a mono- or dichloro-acetic acid or other carboxylic acids of the type having an electronegative group in close proximity of a hydrogen atom while still being capable of forming the acido group in the Werner complex, such resinous materials as the phenolics, nitrogenous resinous forming materials, nitrocellulose, alkylated cellulose derivatives, cellulose ethers, cellulose esters, hydroxy alkylcellulose, polyacrylates, polymethacrylates, and other polyalkylacrylates, polyvinyl ester, polyesters, polyamides, polyethers, polytetrafluoroethylene and other organic compounds and resinous materials containing active electronegative groups of N, O and S may be adhered, closely associated or attracted to the treated glass surfaces.

The chromium complex formed with the desired acido group may be prepared in the manner described in the Iler patents but substituting the desired carboxylic acid or derivative thereof for the long chain carboxylic acids of Iler. These may be diluted in alcohol, such as isopropyl alcohol, or in alcoholic and water solutions. For purpose of economy and safety in application, I prefer to use water as a major portion of the diluent. The complex may be applied in concentration of from 0.1 to 10 per cent, but preferably it is applied as a solution in a water and alcohol mixture having from 0.2 to 2.0 per cent by weight of the chromium complex.

For modifying the surfaces of the glass-like fibers, application of the treating material may be made directly to the fibers while they are being formed, as by wiping a solution of the complex on the multiplicity of filaments as they are mechanically drawn from the melting furnace and collected into strands. In the staple fiber process, application may be made by spraying or flowing the treating material over the fibers as they are being collected or while they are in collected form, as a fabric, or else by drawing the strands or fabrics of these fibers through a bath of the treating material. If the siliceous fibers are collected into some form for which purpose the fibers are first treated, as by the application of a size or oil, it is expedient, for best results, to remove these foreign materials before application of the complex. This can be done effectively by a heat treatment which also further conditions the glass for receiving the complex, or, else, the foreign matter may be washed from the surfaces; if of a gelatin or starchy nature, the wash may contain an alkali.

Application may be made at normal room temperatures and then air dried with the result that a very faint green coloration appears on the glass fiber surfaces if the treating material is one of the chromium complexes; it being understood that other complexes having the desired characteristics might be formed of cobalt, nickel, copper and lead, which complexes also appear closely to associate themselves with the surfaces of the glass fiber. Although an air dry is sufficient to set the complex on the glass surfaces, a more rapid treatment and perhaps a stronger bond is effected if the treated fibers are heated from one to thirty minutes at 150° F. to 300° F.

What I have discovered is a means for modifying the surfaces of glass and other mineral fibers for enhancing their use in specific applications. In order to effect this purpose, it is not necessary, as in Iler, to limit the carbon length of the described acido group for I have found that a chromium complex having an acido group with less than 6 carbon atoms may be used with excellent results. However, if the acido group has more than 8 carbon atoms, some degree of protection and lubricity is provided, and, if the carbon length is in the order of 12 to 26, the complex appears to not only function as a surface modifier, but also to operate as a lubricant. It is within the concept of the invention to use a chromium complex in which the acido group contains one or more of the desired groupings described, and yet is of a carbon length and structure to exhibit the characteristics of effecting the adhesion tension or bond strength between materials and the mineral fiber surfaces and to protect the surfaces of the glass fibers, as a size.

When glass fibers, treated in the manner described, are incorporated with resinous materials in the manufacture of coated fabrics and reinforced plastics and laminates, not only is the initial strength of the product exceptionally good, but marked superiority is shown when these plastics and laminates are compared with similar products formed with untreated fibers, especially when tested under relatively high moisture conditions. There is reason to believe that, as a result of their apparent stability in moisture, these materials might also be used for improved electrical insulations.

The resulting improved adhesion makes possible the use of dyes or pigmented resinous coating materials for economically coloring the glass fibers. These materials, then, are not as readily separated from the fibers in subsequent washing operation. Other materials, such as metal powders and flakes, may similarly be applied with a suitable carrier to the surfaces of glass fibers and these may be used for such specific applications as a heat or flameproof barrier and the like.

The ultimate object of my invention is embodied in the treatment of mineral fiber surfaces to impart certain characteristics to those fibers, the most important of which is to provide for improved adhesion with the various types of synthetic resins that are incorporated with glass fiber in the manufacture of coated fabrics, plastics, laminates and electrical insulation. The treating material may itself operate as a lubricant or a protective coating without substantial loss of the improved adhesion characteristics. The treating material may also operate to reduce the adhesion tension between a coating material and the mineral fiber surfaces as is sometimes desired in the production of fabrics of high tensile strength. By this means, the degree of attraction or adhesion of materials to the fiber surfaces may be varied over a wide range. As a further use, these treated fibers may be used as a tower packing where one or a group of similar materials is able preferentially to wet the fibers while in the presence of others to effect their separation or to break an emulsion, as in the rectification of alcohol and water mixture or coalescing a water in oil emulsion.

Although description has been made of the use of these trivalent nuclear chromium complexes as a surface modifying agent for mineral fibers and especially glass fibers, selected complexes may also be used to advantage as an ingredient with various coating materials such as waxes, oils, synthetic resins, varnishes and miscellaneous materials to effect their initial adherence or lack of adherence to mineral fiber surfaces and to effect the maintenance of these characteristics in the presence of water or other atmospheres. For example, these chromium complexes may be incorporated as an ingredient in amounts ranging from 0.1 to 10 per cent with a size applied to the surfaces of glass fibers, or in a coating composition to be incorporated with the fibers.

The following are illustrative of some of the various applications to which these chromium complexes may be used:

*Example 1.*—A treating composition to improve the attraction of various resinous materials to the glass fiber surfaces may contain, 2 parts of the reaction product of cyanoacetic acid and chromic chloride prepared in accordance with one of the processes described in the Iler patents
5 parts isopropyl alcohol
93 parts water The mixture is applied to the fibers in the form of a textile fabric after the fabric has been heat treated for 5 to 15 hours at 500° F. to 700° F. to burn off the size. The treated fabric, either air dried or baked for 5 to 10 minutes at 250° F. to 300° F., is suitable for impregnation with resinous materials of the type styrene, polyvinyl chloride, synthetic rubbers and the like. The chrome complex serves to increase the adhesion tension of the resinous material to the glass surface in the presence of most atmospheres.

*Example 2.*—A treating compound for reducing the adherence between the resinous coating and the treated surfaces of glass fibers may contain, 2 parts of the reaction product of palmitic acid and chromyl chloride prepared in accordance with one of the processes described in the Iler patents
8 parts isopropyl alcohol
90 parts water The mixture may be wiped on the glass filaments as they are drawn from the glass melting furnace and collected into the form of a strand. The residue, after the volatiles have been removed, as by an air dry, operates as a lubricant for the fibers to prevent the fibers from seizing one another, and, at the same time, limits the adherence of many of the resinous materials to the treated glass surface.

*Example 3.*—A coating composition for application to continuous glass filaments in the form of strands or yarns, may contain, 4.0 parts dextrinized starch
0.1 part gelatin
0.1 part polyvinyl alcohol
0.2 part of the complex formed of dichloroacetic acid and chromic chloride
95.6 parts water The composition may be wiped on the glass filaments as they are drawn from the glass melting furnace and then either air dried or baked for about 5 minutes at 250° F. to remove the volatiles. In this formulation, the chromic complex improves the adhesion tension of the other solids to the surfaces of the coated glass fibers and also improves the adhesion of the associated materials which operate as a size for the fibers. This latter improvement appears to prevent the squeezing out of the protective coating materials under the pressures generated in winding the strands into a package, otherwise, if the coating were removed, the fibers would tend to seize one another and soon be destroyed or excessive waste results in the rewinding.

*Example 4.*—A resinous impregnating composition for coating the glass fiber in a textile fabric may contain, 40 parts polyvinyl chloride
10 parts di-octylphthalate
2 parts of a chromium complex formed of the reaction product of 1-cyano propionic acid and chromic chloride in accordance with one of the processes of the Iler patents
38 parts water Ordinarily the vinylchloride, di-octylphthalate and water are first prepared as an emulsion or dispersion with a cationic emulsifying agent and then the chromium complex is incorporated. The impregnation may be made on a glass fiber fabic after the fabric has first been heat treated to burn off the size. A composition of the type described may be applied by a knife coating process and the impregnated fabric may be heat treated for 5 to 25 minutes at 250° F. to 350° F. to drive off the solvents. In this instance, the resinous material shows excellent initial adherence to the glass fiber surfaces and the adherence is not greatly reduced in the presence of high humidities.

A cardinal feature of this invention resides in a mineral fiber surface, and especially a glass fiber surface, which is treated so that materials heretofore regarded as being non-adherent are rendered adherent to a practical degree and, on the other hand, materials heretofore regarded as being preferentially attracted can be used with a satisfactory degree of repellency. Thus it is possible to gain a predetermined degree of adhesion of selected materials, such as resinous materials, to the treated fiber surface and to maintain that adhesion even when exposed to substances which heretofore ordinarily displaced or greatly altered the bond between those materials and untreated fiber surfaces.

Reference is made to my copending application Ser. No. 734,862, filed on March 14, 1947, on a specific embodiment wherein the acido group coordinated with the tri-valent nuclear chromium atom in the Werner complex compound has 3 to 6 carbon atoms and an unsaturated linkage between the alpha and beta carbon atoms.

It is to be understood that the carbon length or size and molecular arrangement of the acido group, the number and types of activating groups in the acido group and the manner of application thereof to the fiber surfaces may be varied over a wide range without departing from the spirit of the invention, especially as defined in the following claims.

I claim:
1. An article of manufacture comprising glass fibers, and a treating material coating the surfaces of the fibers, said treating material being a complex compound of the Werner type in which a trivalent nuclear chromium atom is coordinated with the acido group of dichloroacetic acid.

2. An article of manufacture comprising glass fibers and a treating material insolubilized on the surfaces of the glass fibers, said treating material being a type of Werner complex compound based on an atom selected from the group consisting of chromium, cobalt, nickel, copper and lead having coordinated therewith an acido group having 1 to 6 carbon atoms and containing a labile hydrogen group.

3. The method of fabricating glass fibers which are highly attractive to specific materials heretofore considered unattracted to glass fibers which comprises applying to the glass fibers a 0.1–10 per cent solution of a complex compound of the Werner type in which a trivalent nuclear chromium atom is coordinated with an acido group having 1 to 6 carbon atoms constituted with functional groups, and insolubilizing the complex compound on the glass fiber surfaces.

4. In the method of treating glass fibers to improve their receptivity for resinous materials, the steps of treating the glass fiber surfaces with a complex compound of the Werner type in which a trivalent nuclear chromium atom is coordinated with an acido group having 1 to 6 carbon atoms constituted with at least one labile hydrogen group capable of ionic association with groups contained in the resinous material, and insolubilizing the complex on the glass fibers.

5. The method of fabricating products of glass fibers bonded with resinous materials which comprises removing foreign material from the surfaces of the glass fibers, impregnating the glass fibers with a resinous composition including a diluent and less than 5 per cent by weight of the resinous material of a complex compound of the Werner type in which a trivalent nuclear chromium atom is coordinated with an acido group having from 1 to 6 carbon atoms and containing labile hydrogen groups, and then removing the diluent from the impregnated mass by heat.

6. An article of manufacture comprising glass fibers and a material insolubilized on the glass fiber surfaces, said treating material comprising a complex compound of the Werner type in which a trivalent nuclear chromium atom is coordinated with an acido group having from 1 to 6 carbon atoms and constituted with functional groups.

7. An article of manufacture comprising glass fibers coated with a treating material originally deposited from a 0.1 to a 10 per cent solution and insolubilized on the glass fiber surfaces, said treating material comprising a complex compound of the Werner type in which a trivalent nuclear chromium atom is coordinated with an acido group having from 1 to 6 carbon atoms and constituted with a labile hydrogen group.

8. In the method of fabricating glass fibers to have a high affinity for resinous coating materials, the steps of applying to the glass fiber surfaces a 0.1 to 10 per cent solution of a complex compound of the Werner type in which a trivalent nuclear chromium atom is coordinated with an acido group having from 1 to 6 carbon atoms containing an electronegative group adjacent a hydrogen atom connected directly to carbon, and insolubilizing the complex compound on the glass fiber surfaces.

9. The method of fabricating glass fibers to have a high affinity for resinous coating materials, which comprises applying to the glass fiber surfaces a 0.1 to 10 per cent solution of a complex compound of the Werner type in which a trivalent nuclear chromium atom is coordinated with the acido group of dichloro acetic acid, and insolubilizing the complex compound on the glass fiber surfaces by drying.

10. In a glass fiber fabric, the fibers of which are coated with a resinous material, an agent on the glass fiber surfaces for anchoring the resinous material to the glass fiber surfaces comprising a complex compound of the Werner type in which a tri-valent nuclear chromium atom is coordinated with an acido group having from 1 to 6 carbon atoms containing at least one functional group capable of ionic association with groups contained in the resinous material so as to increase the attraction of the resinous material for the glass fiber surfaces.

11. An article of manufacture as claimed in claim 10, in which the complex compound comprises less than 5 percent by weight of the resinous material.

12. In a glass fiber fabric impregnated with a resinous material having a functional donor group, an agent for anchoring the resinous material to the glass fiber surfaces comprising a complex compound of the Werner type in which a tri-valent nuclear chromium atom is coordinated with an acido group having from 1 to 6 carbon atoms and containing a labile hydrogen atom said complex compound being present in amounts less than five percent by weight of the resinous material.

13. The method of increasing the affinity of glass fibers for thermoplastic, water-insoluble organic polymers containing recurring dipole groups which comprises applying to the fibers a dilute solution of a complex compound of the Werner type in which a trivalent nuclear chromium atom is coordinated with the acido group of dichloroacetic acid, and then drying the coated fibers.

14. An article of manufacture comprising glass fibers provided with a small amount of an in situ dried coating of a treating material, said treating material being a complex compound of the Werner type in which a trivalent nuclear chromium atom is coordinated with the acido group of dichloroacetic acid.

15. A bonded structure comprising glass fibers provided with a coating of a water-insoluble, heat-softenable, organic polymer containing recurring dipole groups, and a small amount of an intermediate anchoring coating medium between the fibers and the polymer coating, said coating medium comprising essentially a compound of the Werner type in which a trivalent nuclear atom of a metal of the group consisting of chromium, cobalt, and nickel is coordinated with a carboxylic acido group from the class consisting of saturated aliphatic carboxylic acido groups having less than six carbon atoms in the chain and bearing at least one dipole group and aromatic carboxylic acido groups bearing at least one dipole group.

16. In a process for producing a bonded structure, the steps comprising applying to glass fibers a dilute solution of a compound of the Werner type in which a trivalent nuclear atom of a metal of the group consisting of chromium, cobalt, and nickel is coordinated with a carboxylic acido group from the class consisting of saturated aliphatic carboxylic acido groups having less than six carbon atoms in the chain and bearing at least one dipole group and aromatic carboxylic acido groups bearing at least one dipole group, drying the coated fibers to remove solvent, and thereafter applying a coating of a water-insoluble, heat-softenable, organic polymer containing recurring dipole groups.

ROBERT STEINMAN.

REFERENCES CITED

The following references are of record in the file of this patent:

UNITED STATES PATENTS

| Number | Name | Date |
| --- | --- | --- |
| 2,273,040 | Iler | Feb. 17, 1942 |
| 2,307,045 | Iler | Jan. 5, 1943 |
| 2,341,885 | Sowa | Feb. 15, 1944 |
| 2,356,161 | Iler | Aug. 22, 1944 |